United States Patent
Park

(10) Patent No.: US 11,731,616 B2
(45) Date of Patent: Aug. 22, 2023

(54) AUTONOMOUS DRIVING SYSTEM FOR PREVENTING COLLISION OF CUT-IN VEHICLE AND AUTONOMOUS DRIVING METHOD THEREOF

(71) Applicant: HYUNDAI MOBIS CO., LTD., Seoul (KR)

(72) Inventor: Jin Young Park, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 266 days.

(21) Appl. No.: 17/098,911

(22) Filed: Nov. 16, 2020

(65) Prior Publication Data
US 2022/0001859 A1 Jan. 6, 2022

(30) Foreign Application Priority Data
Jul. 2, 2020 (KR) .......................... 10-2020-0081604

(51) Int. Cl.
*B60W 30/09* (2012.01)
*B60W 30/095* (2012.01)
*B60W 60/00* (2020.01)

(52) U.S. Cl.
CPC ........ *B60W 30/09* (2013.01); *B60W 30/0956* (2013.01); *B60W 60/0011* (2020.02);
(Continued)

(58) Field of Classification Search
None
See application file for complete search history.

(56) References Cited

U.S. PATENT DOCUMENTS

2013/0325306 A1* 12/2013 Caveney ........... B60W 30/0953
701/117
2018/0074505 A1* 3/2018 Lv ......................... G05D 1/0246
(Continued)

FOREIGN PATENT DOCUMENTS

CN 102815298 A 12/2012
CN 105206068 A 12/2015
(Continued)

OTHER PUBLICATIONS

Office Action issued in corresponding Korean Patent Application No. 10-2020-0081604 dated Jul. 6, 2021.
(Continued)

*Primary Examiner* — Tamara L Weber
(74) *Attorney, Agent, or Firm* — Morgan, Lewis & Bockius LLP

(57) ABSTRACT

An autonomous driving system for preventing collision with a cut-in vehicle may include a counterpart vehicle detector detecting driving information of a surrounding vehicle to deliver the driving information of the surrounding vehicle to a vehicle controller, a host vehicle detector detecting driving information of a host vehicle to deliver the driving information of the host vehicle to the vehicle controller, and the vehicle controller generating avoidance routes for avoiding collision with the surrounding vehicle entering a front of the host vehicle, designating a reach location according to a speed at a specific interval on the avoidance routes, and selecting an avoidance route for avoiding the collision among the plurality of avoidance routes, and then controlling a speed of the host vehicle to reach the reach location for avoiding the collision with the surrounding vehicle on the selected avoidance route, when there is possibility of collision.

16 Claims, 7 Drawing Sheets

(52) U.S. Cl.
CPC ..... *B60W 60/0015* (2020.02); *B60W 2552/53* (2020.02); *B60W 2556/65* (2020.02); *B60W 2720/10* (2013.01)

(56) References Cited

U.S. PATENT DOCUMENTS

| | | | | |
|---|---|---|---|---|
| 2019/0220030 A1* | 7/2019 | Ohmura | ............ | B60W 30/0953 |
| 2019/0351899 A1* | 11/2019 | Adam | ............... | B60W 50/0097 |
| 2019/0369626 A1* | 12/2019 | Lui | ..................... | G05D 1/0221 |
| 2019/0391582 A1* | 12/2019 | Jung | ..................... | B60W 30/16 |
| 2021/0237723 A1* | 8/2021 | Lee | ........................ | B60Q 5/006 |

FOREIGN PATENT DOCUMENTS

| | | |
|---|---|---|
| CN | 107031619 A | 8/2017 |
| CN | 110488802 A | 11/2019 |
| JP | 2015-041222 A | 3/2015 |
| JP | 2017-224168 A | 12/2017 |
| JP | 2020-86865 A | 6/2020 |
| JP | 2020-086865 A | 6/2020 |
| KR | 10-1551096 B1 | 9/2015 |
| KR | 10-1610544 B1 | 4/2016 |
| KR | 10-2016-0056711 A | 5/2016 |
| KR | 10-1664585 B1 | 10/2016 |
| KR | 10-2017-0090672 A | 8/2017 |
| WO | 2018/216123 A1 | 11/2018 |

OTHER PUBLICATIONS

Notice of Allowance issued in corresponding Korean Patent Application No. 10-2020-0081604 dated Jan. 11, 2022, with English translation.

Office Action issued in corresponding Chinese Patent Application No. 202011314326.3 dated Apr. 27, 2023, with English translation.

* cited by examiner

AUTONOMOUS DRIVING SYSTEM FOR PREVENTING COLLISION OF CUT-IN VEHICLE AND AUTONOMOUS DRIVING METHOD THEREOF

CROSS-REFERENCE TO RELATED APPLICATION

This application claims the benefit of priority to Korean Patent Application No. 10-2020-0081604, filed in the Korean Intellectual Property Office on Jul. 2, 2020, the entire contents of which are incorporated herein by reference.

TECHNICAL FIELD

The present disclosure relates to an autonomous driving system for preventing a collision with a cut-in vehicle, and a method thereof, and more particularly, relates to an autonomous driving system for preventing a collision with a cut-in vehicle, which is capable of avoidance driving to avoid the collision with a route obstructing vehicle cutting in to the front while an autonomous driving vehicle is driving.

BACKGROUND

In general, an autonomous driving system refers to a system in which automatic driving to a predetermined destination is possible by recognizing surrounding situations and the status of a vehicle without a driver's intent.

Such the autonomous driving system includes the steps of recognition, determination, route creation, and vehicle control. The route creation needs to generate an avoidance route in real time by detecting changes in obstacles, and to generate a route to which the kinematic behavior features of a vehicle is reflected.

In particular, because a variety of dangerous situations may occur when an autonomous driving vehicle attempts to change a lane in urban areas, congested sections, and highways in which traffic situations are changed in real time, it is possible to drive safely by generating a stable driving route in consideration of the collision with surrounding dynamic obstacles.

The conventional method of determining the driving plan of a host vehicle by grasping the behaviors of surrounding vehicles has widely used artificial intelligence or deep learning schemes.

However, such the method may lead to results not matched with the developer's intent, and it is difficult to grasp the cause and to revise/correct the cause when an accident occurs.

SUMMARY

The present disclosure has been made to solve the above-mentioned problems occurring in the prior art while advantages achieved by the prior art are maintained intact.

An aspect of the present disclosure provides an autonomous driving system and method for preventing the collision with a cut-in vehicle, which allows an autonomous driving vehicle to perform avoidance driving to avoid a collision with a vehicle cutting in to the front during driving, and which may allow the autonomous driving vehicle to follow the center of the lane, may plan avoidance driving by generating a plurality of candidate avoidance routes for avoiding the collision with the cut-in vehicle cutting in to the front during driving, may apply the speed profile of the autonomous driving vehicle on the candidate avoidance routes, and may adjust the speed of the autonomous driving vehicle depending on a cut-in scenario, thereby avoiding the collision with the cut-in vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an autonomous driving system for preventing a collision with a cut-in vehicle may include a counterpart vehicle detector detecting driving information of a surrounding vehicle to deliver the driving information of the surrounding vehicle to a vehicle controller, a host vehicle detector detecting driving information of a host vehicle to deliver the driving information of the host vehicle to the vehicle controller, and the vehicle controller generating a plurality of avoidance routes for avoiding a collision with the surrounding vehicle entering a front of the host vehicle, designating a reach location according to a speed at a specific interval on the avoidance routes, and selecting an avoidance route for avoiding the collision among the plurality of avoidance routes, and then controlling a speed of the host vehicle to reach the reach location for avoiding the collision with the surrounding vehicle on the selected avoidance route, when there is a possibility of a collision between the surrounding vehicle and the host vehicle.

In an embodiment, the avoidance route may include a lane, a left lane located on a left side of the lane, and a right lane located on a right side of the lane.

In an embodiment, the avoidance route may include a center line that is a lane center of a lane, a left boundary line of the lane, a right boundary line of the lane, a left line between the center line and the left boundary line, and a right line between the center line and the right boundary line.

In an embodiment, the reach location may include a constant speed location reached when the host vehicle drives at a constant speed, an acceleration location reached when the host vehicle drives by accelerating by a specific range from the constant speed, and a deceleration location reached when the host vehicle drives by decelerating by the specific range from the constant speed.

In an embodiment, the vehicle controller may control the host vehicle to maintain driving at the constant speed, when there is no possibility of the collision with the surrounding vehicle while the host vehicle is driving on a lane at the constant speed, may control the host vehicle to drive by accelerating to a speed for reaching the acceleration location such that the host vehicle avoids the collision with the surrounding vehicle, when the collision with the surrounding vehicle is expected while the host vehicle is driving in the lane at the constant speed, and an expected collision area is located behind the constant speed location on the selected avoidance route, and may control the host vehicle to drive by decelerating to a speed for reaching the deceleration location, to avoid the collision between the surrounding vehicle and the host vehicle when the collision with the surrounding vehicle is expected while the host vehicle is driving on the lane at the constant speed, and when an expected collision area is formed ahead of the constant speed location on the selected avoidance route.

In an embodiment, the vehicle controller may control the host vehicle to drive by returning to the constant speed when the host vehicle avoids the collision with the surrounding vehicle by decreasing to a speed of the deceleration location on the lane or by increasing to a speed of the acceleration location on the lane.

In an embodiment, the vehicle controller may control the host vehicle to drive at the constant speed by moving to an adjacent avoidance route, may control the host vehicle to drive by decelerating to a speed of the deceleration location on the adjacent avoidance route, or may control the host vehicle to drive by accelerating to a speed of the acceleration location on the adjacent avoidance route, when the host vehicle does not avoid the collision with the surrounding vehicle on the lane.

In an embodiment, the vehicle controller may control the host vehicle to drive at the constant speed by returning to the lane, when the host vehicle avoids the collision with the surrounding vehicle by driving at the constant speed while the host vehicle moves to the adjacent avoidance route, by driving while the host vehicle decelerates to the speed of the deceleration location on the adjacent avoidance route, or by driving while the host vehicle accelerates to the speed of the acceleration location on the adjacent avoidance route.

In an embodiment, the vehicle controller may control the host vehicle to stop on the lane after deceleration, when the possibility of the collision between the surrounding vehicle and the host vehicle is present on all the generated avoidance routes.

According to an aspect of the present disclosure, An autonomous driving method for preventing a collision with a cut-in vehicle may include generating a plurality of avoidance routes for avoiding a collision with an surrounding vehicle entering a front of a host vehicle, designating a reach location according to a speed at a specific interval on the avoidance routes, and selecting an avoidance route for avoiding the collision among the plurality of avoidance routes, and then controlling a speed of the host vehicle to reach the reach location for avoiding the collision with the surrounding vehicle on the selected avoidance route, when there is a possibility of a collision between the surrounding vehicle and the host vehicle.

In an embodiment, the generating of the plurality of avoidance routes may include generating the avoidance route including a lane, a left lane located on a left side of the lane, and a right lane located on a right side of the lane.

In an embodiment, the generating of the plurality of avoidance routes may include generating the avoidance route including a center line that is a lane center of a lane, a left boundary line of the lane, a right boundary line of the lane, a left line between the center line and the left boundary line, and a right line between the center line and the right boundary line.

In an embodiment, the designating of the reach location may include designating the reach location including a constant speed location reached when the host vehicle drives at a constant speed, an acceleration location reached when the host vehicle drives by accelerating by a specific range from the constant speed, and a deceleration location reached when the host vehicle drives by decelerating by the specific range from the constant speed.

In an embodiment, the selecting of the avoidance route may include controlling the host vehicle to maintain driving at the constant speed, when there is no possibility of the collision with the surrounding vehicle while the host vehicle is driving on a lane at the constant speed, controlling the host vehicle to drive by accelerating to a speed for reaching the acceleration location such that the host vehicle avoids the collision with the surrounding vehicle, when the collision with the surrounding vehicle is expected while the host vehicle is driving in the lane at the constant speed, and an expected collision area is located behind the constant speed location on the selected avoidance route, and controlling the host vehicle to drive by decelerating to a speed for reaching the deceleration location, to avoid the collision between the surrounding vehicle and the host vehicle when the collision with the surrounding vehicle is expected while the host vehicle is driving on the lane at the constant speed, and when an expected collision area is formed ahead of the constant speed location on the selected avoidance route.

In an embodiment, the selecting of the avoidance route may include controlling the host vehicle to maintain driving by returning to the constant speed when the host vehicle avoids the collision with the surrounding vehicle by decreasing to a speed of the deceleration location on the lane or by increasing to a speed of the acceleration location on the lane.

In an embodiment, the selecting of the avoidance route may include controlling the host vehicle to maintain driving at the constant speed by moving to an adjacent avoidance route, controlling the host vehicle to drive by decelerating to a speed of the deceleration location on the adjacent avoidance route, or controlling the host vehicle to drive by accelerating to a speed of the acceleration location on the adjacent avoidance route, when the host vehicle does not avoid the collision with the surrounding vehicle on the lane.

In an embodiment, the selecting of the avoidance route may include controlling the host vehicle to maintain driving at the constant speed by returning to the lane, when the host vehicle avoids the collision with the surrounding vehicle by driving at the constant speed while the host vehicle moves to the adjacent avoidance route, by driving while the host vehicle decelerates to the speed of the deceleration location on the adjacent avoidance route, or by driving while the host vehicle accelerates to the speed of the acceleration location on the adjacent avoidance route.

In an embodiment, the selecting of the avoidance route may include controlling the host vehicle to stop on the lane after deceleration, when the possibility of the collision between the surrounding vehicle and the host vehicle is present on all the generated avoidance routes.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
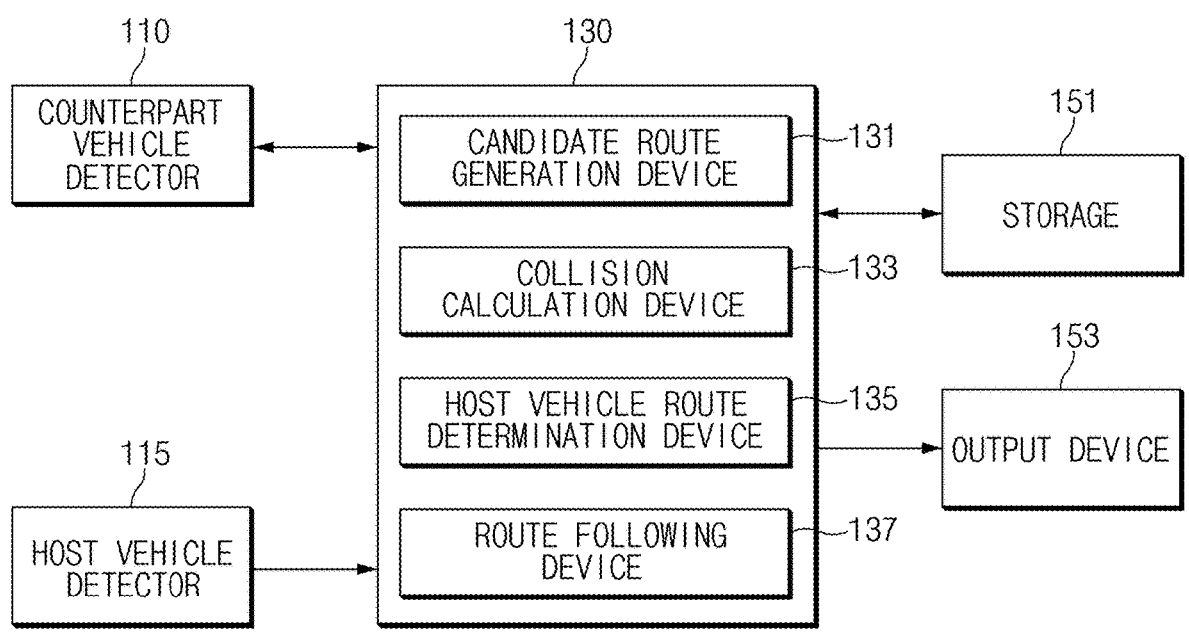
FIG. 1 is a block diagram illustrating an autonomous driving system for preventing a collision with a cut-in vehicle according to an embodiment of the present disclosure.

Hereinafter, exemplary embodiments of the present disclosure will be described in detail with reference to the accompanying drawings. In the drawings, the same reference numerals will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms first, second, A, B, (a), (b), and the like may be used herein. These terms are only used to distinguish one element from another element, but do not limit the corresponding elements irrespective of the nature, order, or priority of the corresponding elements. Furthermore, unless otherwise defined, all terms including technical and scientific terms used herein are to be interpreted as is customary in the art to which this invention belongs. It will be understood that terms used herein should be interpreted as having a meaning that is consistent with their meaning in the context of the present disclosure and the relevant art and will not be interpreted in an idealized or overly formal sense unless expressly so defined herein.

Hereinafter, various embodiments of the present disclosure will be described in detail with reference to FIGS. 1 to 7.

Figure 2:
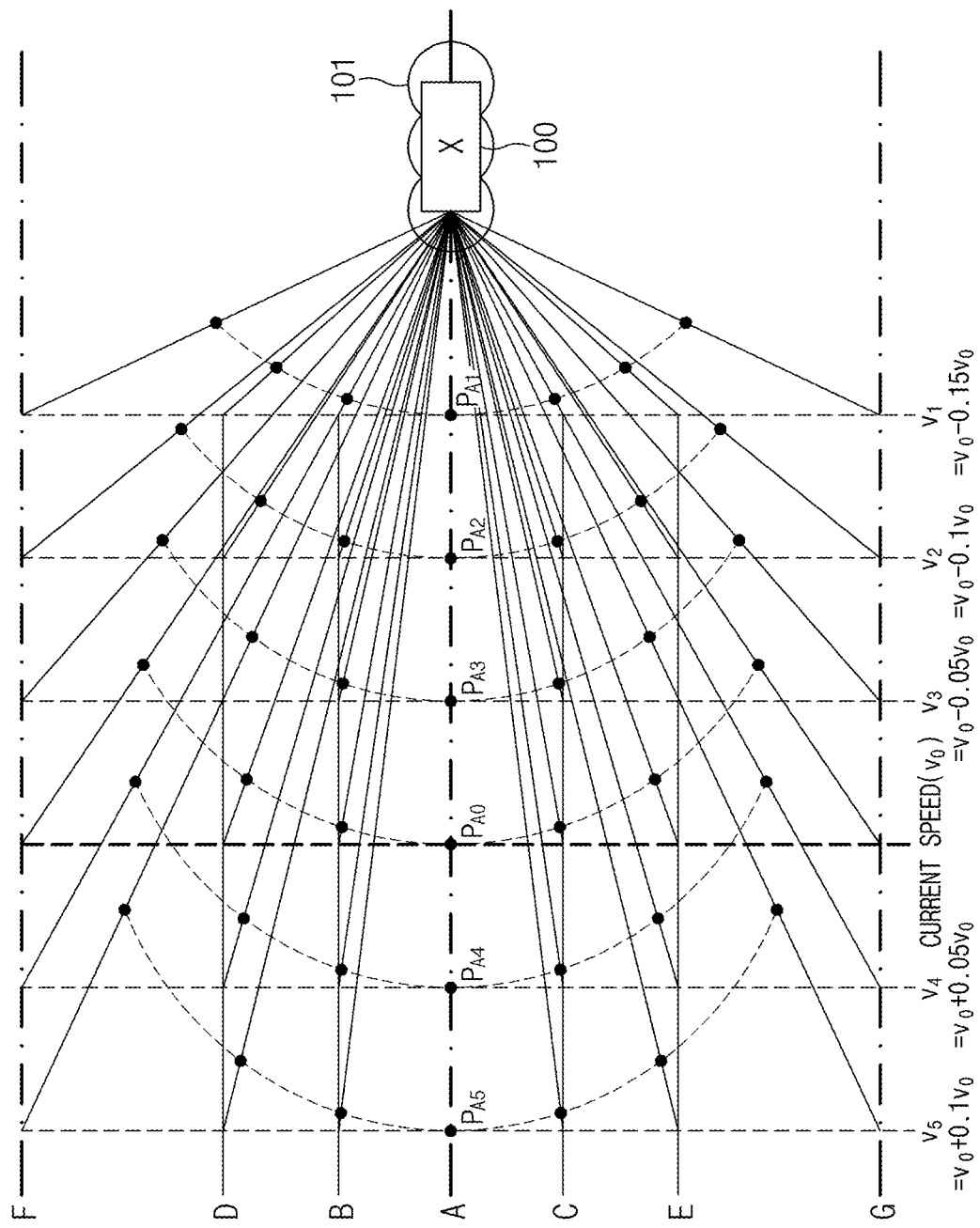
FIG. 2 is a diagram for describing generation of a candidate avoidance route in an autonomous driving system for preventing a collision with a cut-in vehicle according to an embodiment of the present disclosure.

FIG. 1 is a block diagram illustrating an autonomous driving system for preventing a collision with a cut-in vehicle according to an embodiment of the present disclosure. FIG. 2 is a diagram for describing generation of a candidate avoidance route in an autonomous driving system for preventing a collision with a cut-in vehicle according to an embodiment of the present disclosure. FIGS. 3 to 6 are diagrams for describing an avoidance process according to a scenario in an autonomous driving system for preventing a collision with a cut-in vehicle according to an embodiment of the present disclosure. FIG. 7 is a flowchart illustrating an autonomous driving method for preventing a collision with a cut-in vehicle according to an embodiment of the present disclosure.

Referring to FIG. 1, according to an embodiment of the present disclosure, the autonomous driving system for preventing a collision with a cut-in vehicle may be installed in a host vehicle that is an autonomous driving vehicle. While following the current lane, the autonomous driving system may drive such that the host vehicle may avoid a collision with a surrounding vehicle that cuts in from the adjacent lane to the front. The autonomous driving system may include a counterpart vehicle detector 110, a host vehicle detector 115, a vehicle controller 130, storage 151, and an output device 153.

The counterpart vehicle detector 110 may detect driving information of surrounding vehicles to transmit the driving information to the vehicle controller 130; the counterpart vehicle detector 110 may obtain the driving information of surrounding vehicles, using V2X communication.

The V2X technology may include vehicle-to-infrastructure (V2I) communication and vehicle-to-vehicle (V2V) communication.

Various sensors may detect the driving information such as the size, location, departure angle, speed information, and the like of the surrounding vehicle driving in the left or right lane of a lane on which the host vehicle is currently driving, and may include sensors such as an infrared sensor, an ultrasonic sensor, a laser scanner, LiDAR, radar, a Global Positioning System (GPS) receiver, a camera, and the like.

The host vehicle detector 115 may detect vehicle information according to the driving state of the host vehicle through the various sensors provided in the host vehicle; the host vehicle detector 115 may obtain the vehicle's speed, position, steering angle, or the like through a speed sensor, a position sensor, a steering angle sensor, or the like.

The vehicle controller 130 may include an electrical control unit (ECU); the vehicle controller 130 may generate a plurality of avoidance routes to prevent a collision, using the driving information of the surrounding vehicle driving in the left or right lane while the host vehicle is driving; when the surrounding vehicle cuts in to the front, the vehicle controller 130 may select an avoidance route capable of minimally moving among the generated avoidance routes to prevent the collision.

The vehicle controller 130 may include a candidate route generation device 131, a collision calculation device 133, a host vehicle route determination device 135, and a route following device 137.

The candidate route generation device 131 may generate a plurality of avoidance routes for avoiding the collision with surrounding vehicles cutting in to the front while the host vehicle 100 is driving. Referring to FIG. 2, the avoidance route may be generated in a lane where the host vehicle 100 is currently driving, a left lane (G) located on the left side of the lane, and a right lane (F) located on the right side of the lane.

The avoidance route within the lane may be generated in a center line (A) that is the center of the lane, a left boundary line (E) of the lane, a right boundary line (D) of the lane, a left line (C) between the center line (A) and the left boundary line (E), and a right line (B) between the center line (A) and the right boundary line (D).

The host vehicle 100 may drive while following the center line (A) that is the center line of the lane.

Next, an arrival location according to the speed may be designated at regular intervals in the traveling direction of the host vehicle 100 on each avoidance route. For example, in the case of the center line (A), a location capable of being reached upon driving at a constant speed V0 for 't' seconds at the current location of the host vehicle 100 may be designated as PA0; a location capable of being reached upon driving for 't' seconds at a speed V4, which has accelerated by 5% from the constant speed V0, may be designated as PA4; a location capable of being reached upon driving for 't' seconds at a speed V5, which has accelerated by 10% from the constant speed V0, may be designated as PA5; a location capable of being reached upon driving for 't' seconds at a speed V3, which has decelerated by 5% from the constant speed V0, may be designated as PA3; a location capable of being reached upon driving for 't' seconds at a speed V2, which has decelerated by 10% from the constant speed V0, may be designated as PA2; a location capable of being reached upon driving for 't' seconds at a speed V1, which has decelerated by 15% from the constant speed V0, may be designated as PA1.

In addition, points connected through curves to the left and right sides at PA0, PA1, PA2, PA3, PA4, and PA5 may indicate a reach location when the host vehicle 100 travels diagonally at the speed corresponding to the current location.

In the present disclosure, the speed of the host vehicle 100 has been divided into V0~V5 by designating the variation reference of a speed with respect to the constant speed V0 as 5%. However, it is possible to divide the reach location according to the speed of the host vehicle 100 by differently designating the variation reference of the speed. For example, as necessary, the speed of the host vehicle 100 may be divided into V0~V25 by designating the variation reference of the speed as 1%. Alternatively, the speed of the host vehicle 100 may be divided into V0~V250 by specifying the variation reference of the speed as 0.1%.

The collision calculation device 133 may receive driving information of a surrounding vehicle from the counterpart vehicle detector 110 to form a collision area, and may receive driving information of the host vehicle from the host vehicle detector 115 to form a safety area 101. The collision calculation device 133 may determine that the collision area of the surrounding vehicle invading the safety area 101 of the host vehicle 100 is a collision.

The safety area 101 may be expressed as three circles connected in a ring shape toward the front and rear such that the host vehicle 101 is included.

The collision area may indicate a location where the surrounding vehicle may move for 't' seconds and may be expressed in a trapezoidal shape. The height of a trapezoid, which is the collision area, may be adjusted depending on the speed of the surrounding vehicle, and the width of the trapezoid may be adjusted depending on the steering angle corresponding to the speed.

That is, the height of the collision area may be proportional to the speed of the surrounding vehicle, and the width may be determined by the turning radius according to the speed.

The range of the turning radius according to the speed may be determined as a general value by experiment, or may be determined by the subjective determination on safety. For example, when the collision area is set widely, it is possible to focus on the safety of the host vehicle.

When there is a possibility of the collision between the host vehicle and the surrounding vehicle, the host vehicle route determination device 135 may select an avoidance route capable of avoiding a collision while moving by a minimum distance among a plurality of avoidance routes. The host vehicle route determination device 135 may stepwise determine an avoidance route in the remaining areas other than an area including the collision area of the surrounding vehicle, and an area included when the safety area 101 of the host vehicle and the collision area of the surrounding vehicle are intersected with each other, among the plurality of avoidance routes.

The priority of collision avoidance may be the speed control during center following in the current lane; the next priority of the collision avoidance may be the avoidance and lane change in the current lane; the last priority for collision avoidance may be the waiting in the current lane when there is no avoidance space.

Figure 3:
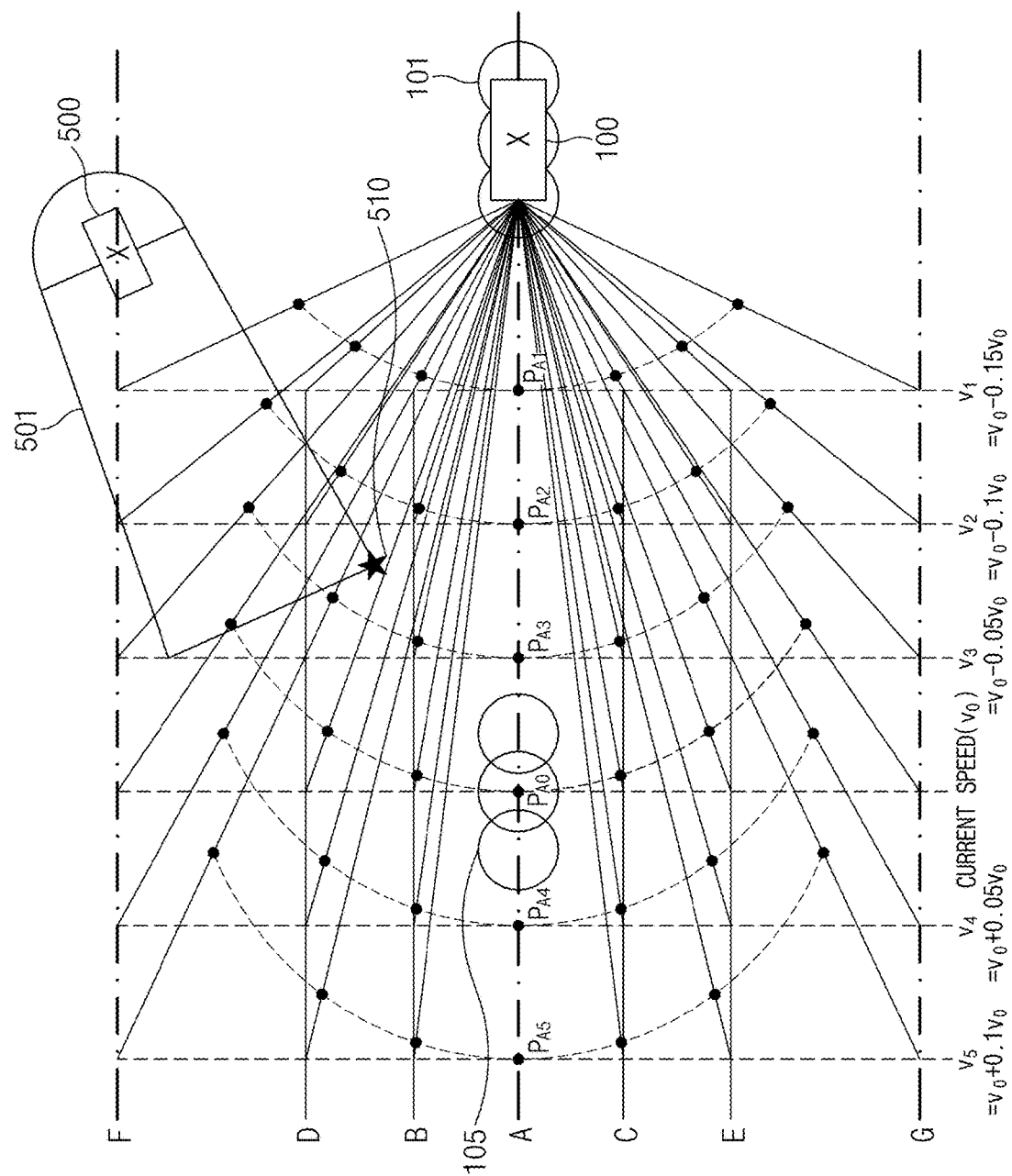
FIGS. 3 to 6 are diagrams for describing an avoidance process according to a scenario in an autonomous driving system for preventing a collision with a cut-in vehicle according to an embodiment of the present disclosure.

First of all, referring to FIG. 3, the case where the surrounding vehicle 500 cuts in to the front at a speed slower than the constant speed V0 of the host vehicle 100 may be the case where there is no possibility of the collision between the host vehicle 100 and the surrounding vehicle 500 because there is no intersection point between the safety area 101 of the host vehicle 100 and the collision area 501 of the surrounding vehicle 500.

Next, it is possible to determine whether there is a reach location in the case of acceleration in the current lane within 10% range from the current speed and the case of deceleration in the current lane within 10% range from the current speed; It is possible to determine whether there is the reach location PA0 at a point in time when the host vehicle 100 is driving in the center line (A) currently driving at the constant speed V0, the reach locations PA2 and PA3 in the case of deceleration to 10% of the constant speed V0, and the reach locations PA4 and PA5 in the case of acceleration to 10% of the constant speed V0 (S101).

Accordingly, because PA0, PA2, PA3, PA4 and PA5 are present in the center line (A) without interference with the collision area 501, the vehicle controller 130 may determine that the host vehicle 100 is capable of maintaining driving in the center line (A).

Then, it may be determined whether the collision area 101 of the host vehicle 100 and the collision area 501 of the surrounding vehicle 500 are intersected with each other at location PA0 (S102); because there is no possibility of the collision between the host vehicle 100 and the surrounding vehicle 500 at location PA0, the host vehicle 100 may drive while maintaining the constant speed V0 in the center line (A) that is the current lane (S103).

Figure 4:
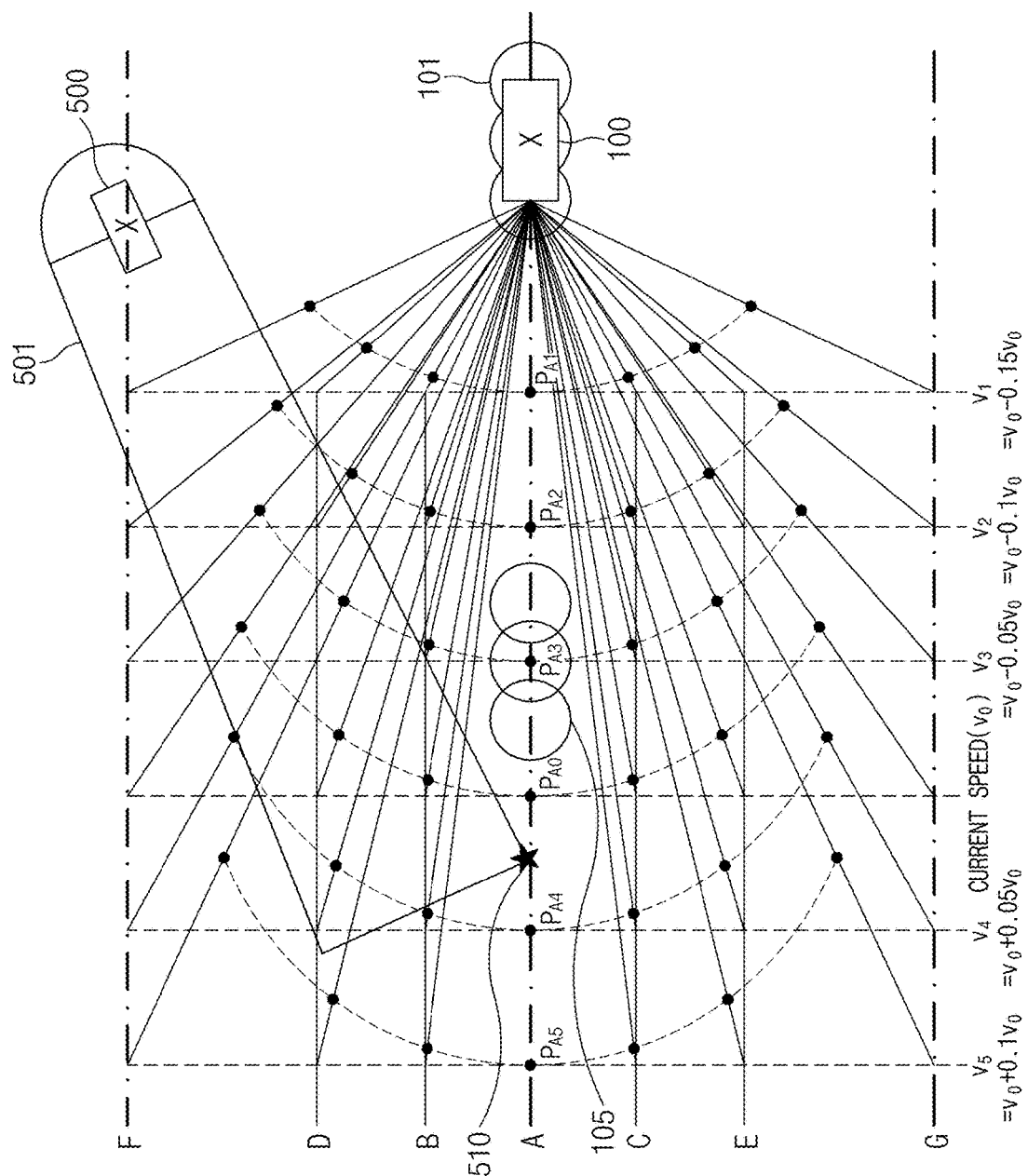

Referring to FIG. 4, the case where the surrounding vehicle 500 cuts in to the front at a speed faster than the constant speed V0 of the host vehicle 100 may be the case where the possibility of the collision between the host vehicle 100 and the surrounding vehicle 500 is present because the intersection point between the safety area 101 of the host vehicle 100 and the collision area 501 of the surrounding vehicle 500 is present.

Next, it is possible to determine whether there is a reach location in the case of acceleration in the current lane within 10% range from the current speed and the case of deceleration in the current lane within 10% range from the current speed; It is possible to determine whether there is the reach location PA0 at a point in time when the host vehicle 100 is driving in the center line (A) currently driving at the constant speed V0, the reach locations PA2 and PA3 in the case of deceleration to 10% of the constant speed V0, and the reach locations PA4 and PA5 in the case of acceleration to 10% of the constant speed V0 (S101).

Accordingly, because PA0, PA2, PA3, PA4 and PA5 are present in the center line (A), the vehicle controller 130 may determine that the host vehicle 100 is capable of maintaining driving in the center line (A).

Then, it may be determined whether the collision area 101 of the host vehicle 100 and the collision area 501 of the surrounding vehicle 500 are intersected with each other at location PA0 (S102); because the possibility of the collision between the host vehicle 100 and the surrounding vehicle 500 at location PA0 is present, the host vehicle 100 may fail to drive while maintaining the constant speed V0 in the center line (A) that is the current lane.

Next, the location of the collision end 510 of the collision area 501 may be determined (S104); because the location of the collision end 501 is ahead of PA0, that is, because there is a possibility of the collision between the surrounding vehicle 500 and the front portion of the host vehicle 100 when the host vehicle 100 drives at the constant speed V0 and then reaches PA0, the host vehicle 100 may avoid the collision with the surrounding vehicle 500 by driving at the reduced speed (S105).

Accordingly, the host vehicle 100 may avoid the collision with the surrounding vehicle 500 by driving at a speed reduced by 5% from the constant speed V0 in the center line (A), which is the current lane, to reach location PA3.

Figure 5:
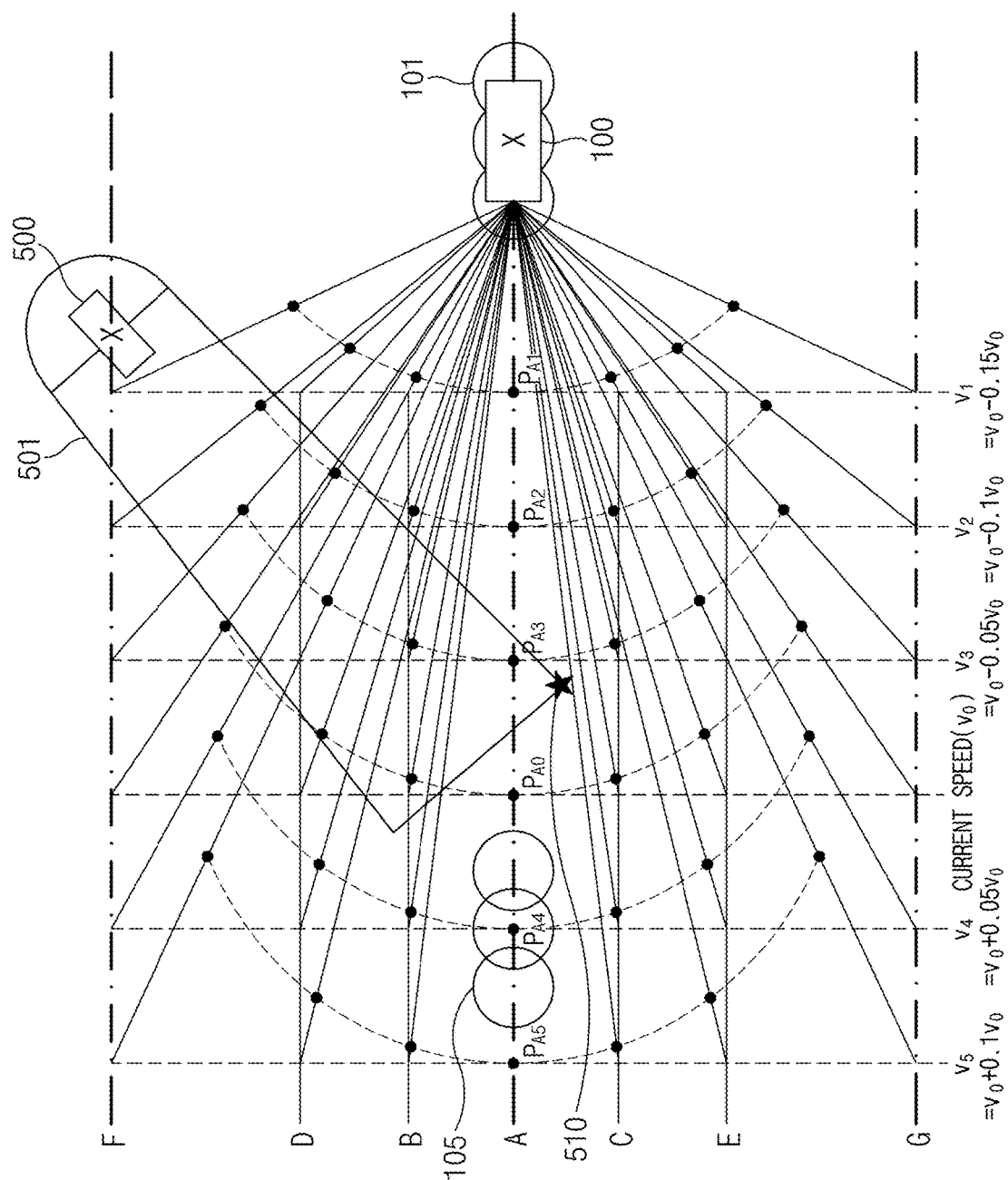

Referring to FIG. 5, the case where the surrounding vehicle 500 cuts in to the front while largely rotating at a speed faster than the constant speed V0 of the host vehicle 100 may be the case where the possibility of the collision between the host vehicle 100 and the surrounding vehicle 500 is present because the intersection point between the safety area 101 of the host vehicle 100 and the collision area 501 of the surrounding vehicle 500 is present.

Next, it is possible to determine whether there is a reach location in the case of acceleration in the current lane within 10% range from the current speed and the case of deceleration in the current lane within 10% range from the current speed; It is possible to determine whether there is the reach location PA0 at a point in time when the host vehicle 100 is driving in the center line (A) currently driving at the constant speed V0, the reach locations PA2 and PA3 in the case of deceleration to 10% of the constant speed V0, and the reach locations PA4 and PA5 in the case of acceleration to 10% of the constant speed V0 (S101).

Accordingly, because PA0, PA2, PA4 and PA5 are present in the center line (A), the vehicle controller 130 may determine that the host vehicle 100 is capable of maintaining driving in the center line (A).

Then, it may be determined whether the collision area 101 of the host vehicle 100 and the collision area 501 of the surrounding vehicle 500 are intersected with each other at location PA0 (S102); because the possibility of the collision between the host vehicle 100 and the surrounding vehicle 500 at location PA0 is present, the host vehicle 100 may fail to drive while maintaining the constant speed V0 in the center line (A) that is the current lane.

Next, the location of the collision end 510 of the collision area 501 may be determined (S104); because the location of the collision end 501 is behind PA0, that is, because there is a possibility of the collision between the surrounding vehicle 500 and the rear portion of the host vehicle 100 when the host vehicle 100 drives at the constant speed V0 and then reaches PA0, the host vehicle 100 may avoid the collision with the surrounding vehicle 500 by driving at the increased speed (S106).

Accordingly, the host vehicle 100 may avoid the collision with the surrounding vehicle 500 by driving at a speed increased by 5% from the constant speed V0 in the current lane, which is the center line (A), to reach location PA4.

Figure 6:
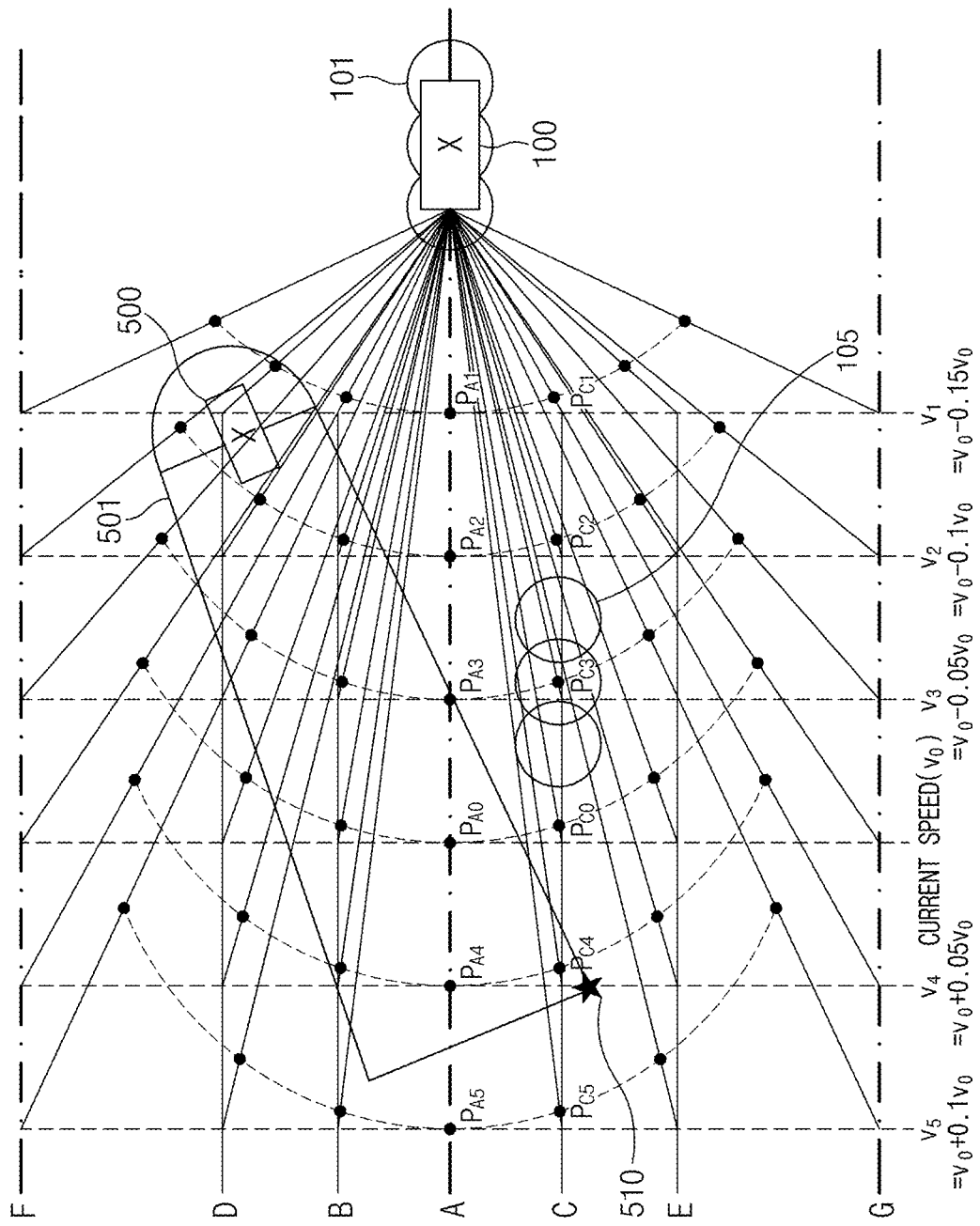
Figure 7:
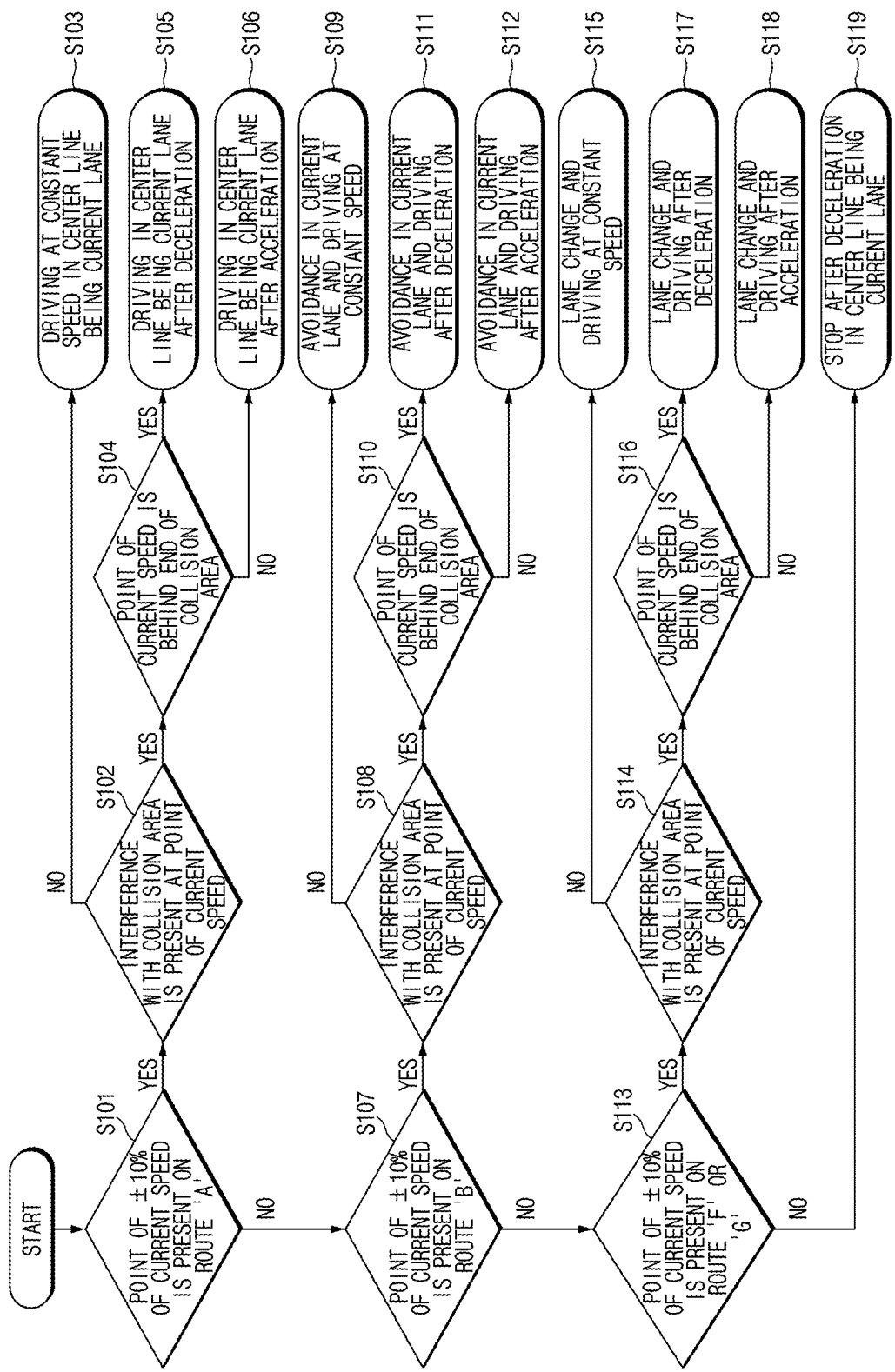
FIG. 7 is a flowchart illustrating an autonomous driving method for preventing a collision with a cut-in vehicle according to an embodiment of the present disclosure.

Referring to FIG. 6, the case where the surrounding vehicle 500 cuts in at a location close to the host vehicle 100 at a speed faster than the constant speed V0 of the host vehicle 100 may be the case where the possibility of the collision between the host vehicle 100 and the surrounding vehicle 500 is present because the intersection point between the safety area 101 of the host vehicle 100 and the collision area 501 of the surrounding vehicle 500 is present.

Next, it is possible to determine whether there is a reach location in the case of acceleration in the current lane within 10% range from the current speed and the case of deceleration in the current lane within 10% range from the current speed; It is possible to determine whether there is the reach location PA0 at a point in time when the host vehicle 100 is driving in the center line (A) currently driving at the constant speed V0, the reach locations PA2 and PA3 in the case of deceleration to 10% of the constant speed V0, and the reach locations PA4 and PA5 in the case of acceleration to 10% of the constant speed V0 (S101).

Accordingly, because PA2 and PA5 are present in the center line (A), the vehicle controller 130 may determine that the host vehicle 100 is capable of maintaining driving in the center line (A).

Then, it may be determined whether the collision area 101 of the host vehicle 100 and the collision area 501 of the surrounding vehicle 500 are intersected with each other at location PA2 and location PA5 (S102); because the possibility of the collision between the host vehicle 100 and the surrounding vehicle 500 at location PA2 and location PA5 is present, it may be determined that the host vehicle 100 fails to drive in the center line (A) that is the current lane.

Accordingly, because the surrounding vehicle 500 is cutting in from the right to the left, It is possible to determine whether there is a reach location in the case of acceleration to a range of 10% from the current speed and in the case of deceleration to a range of 10% from the current speed, on the left line (C) that is an adjacent avoidance route capable of moving with a minimum distance for safety.

Next, it is possible to determine whether there is the reach location PC0 at a point in time when the host vehicle 100 is driving in the left line (C) at the constant speed V0, reach location PC2 and reach location PC3 in the case of deceleration to 10% of the constant speed V0, and reach location PC4 and reach location PC5 in the case of acceleration to 10% of the constant speed V0 (S107).

Accordingly, because PC0, PC2, PC3 and PC5 are present in the left line (C), the vehicle controller 130 may determine that the host vehicle 100 is capable of driving while moving to the left line (C).

Then, it may be determined whether the collision area 101 of the host vehicle 100 and the collision area 501 of the surrounding vehicle 500 are intersected with each other at location PC0 (S108); when there is no possibility of the collision between the host vehicle 100 and the surrounding vehicle 500 at location PC0, it may be determined that the host vehicle 100 is capable of driving while maintaining the constant speed V0 in the left line (C) that is the current lane (S109).

However, there is a possibility of the collision between the host vehicle 100 and the surrounding vehicle 500 at location PC0, and thus the host vehicle 100 fails to drive in the left line (C) while maintaining the constant speed V0.

Next, the location of the collision end 510 of the collision area 501 may be determined (S110); because the location of the collision end 501 is ahead of PC0, that is, because there is a possibility of the collision between the surrounding vehicle 500 and the front portion of the host vehicle 100 when the host vehicle 100 drives at the constant speed V0 and then reaches PC0, the host vehicle 100 may avoid the collision with the surrounding vehicle 500 by driving at the reduced speed (S111).

Accordingly, the host vehicle 100 may avoid the collision with the surrounding vehicle 500 by driving at a speed reduced by 5% from the constant speed V0 to reach location PC3 while moving from the center line (A), which is the current lane, to the left line (C).

In the meantime, because there is a possibility of the collision between the surrounding vehicle 500 and the rear portion of the host vehicle 100 when the location of the collision end 501 is behind PC0, that is, when the host vehicle 100 drives at the constant speed V0 and then reaches PC0, the host vehicle 100 may avoid the collision with the surrounding vehicle 500 by driving at the increased speed (S112).

In addition, when there is a possibility of the collision between the surrounding vehicle 500 and the host vehicle 100 in the center line (A) that is the lane, the left line (C), the right line (B), the left boundary line (E) and the right boundary line (D), the vehicle controller 130 may determine whether a reach location in the case of acceleration to a range of 10% from the current speed and in the case of deceleration to a range of 10% from the current speed, in the left lane (G) or the right lane (F), which are adjacent avoidance routes capable of moving by the minimum distance.

Accordingly, because the surrounding vehicle 500 is cutting in from the right to the left, it may be determined whether the reach location at a point in time when the host vehicle 100 drives at the constant speed V0 in the left lane (G), the reach location in the case of deceleration to 10% from the constant speed V0, and the reach location in the case of acceleration to 10% are present.

Next, when there is a reach location in the left lane (G) and there is no possibility of the collision between the host vehicle 100 and the surrounding vehicle 500 (S114), it may be determined that the host vehicle 100 is capable of driving in the left lane (G) while maintaining the constant speed V0 (S115).

However, because there is a possibility of the collision between the host vehicle 100 and the surrounding vehicle 500 in the left lane (G) (S114), and because the location of the collision end 501 is ahead of the host vehicle 100, when there is a possibility of the collision between the surrounding vehicle 500 and the front portion of the host vehicle 100 (S116), the host vehicle 100 may avoid the collision with the surrounding vehicle 500 by driving at the reduced speed (S117).

Accordingly, the host vehicle 100 may avoid the collision with the surrounding vehicle 500 by driving at the speed reduced from the constant speed V0 while moving from the center line (A), which is the current lane, to the left lane (G).

In the meantime, because the location of the collision end 501 is behind the host vehicle 100, when there is a possibility of the collision between the surrounding vehicle 500 and the rear portion of the host vehicle 100, the host vehicle 100 may avoid the collision with the surrounding vehicle 500 by driving at the increased speed (S118).

Accordingly, the host vehicle 100 may avoid the collision with the surrounding vehicle 500 by driving at the speed increased from the constant speed V0 while moving from the center line (A), which is the current lane, to the left lane (G).

In addition, while the host vehicle is driving in the center line (A), when there is a possibility of the collision with the surrounding vehicle 500 in the center line (A) that is a lane, the left line (C), the right line (B), the left boundary line (E), the right boundary line (D), and the left lane (G) and the right lane (F) that are adjacent lanes, the vehicle controller 130 may allow the host vehicle 100 to stop while decelerating in the center line (A) (S119).

At this time, while the host vehicle 100 is decelerating in the center line (A), the driving information of the surrounding vehicle 500 is changed, and there is a reach location; at this time, when the collision with the surrounding vehicle 500 is capable of being avoided, it is possible to avoid the collision at a constant speed, deceleration or acceleration without stopping.

However, when the possibility of the collision with the surrounding vehicle 500 is still present because there is no reach location until the host vehicle 100 is stopped, the host vehicle 100 may remain in waiting until the collision with the surrounding vehicle 500 is avoided after waiting.

For reference, the host vehicle 100 may drive while following the center of the lane at the preset constant speed V0, using Smart Cruise Control (SCC) and Lane Fallowing Assistance (LFA). When there is no possibility of the collision with the surrounding vehicle 500 in the current lane, the host vehicle 100 may drive while following the center line (A) at the preset constant speed V0.

After the host vehicle 100 may avoid the collision with the surrounding vehicle 500 by decelerating or accelerating while driving in the center line (A), the host vehicle 100 may return to the preset constant speed V0 and may drive while following the center line (A).

The host vehicle 100 may avoid the collision with the surrounding vehicle 500 at the constant speed V0, deceleration, or acceleration by moving to the left line (C), the right line (B), the left boundary line (E), the right boundary line (D), the left lane (G), or the right lane (F); afterward, the host vehicle 100 may move to the center line (A) and may drive while following the center line (A) at the preset constant speed V0.

Because there is a possibility of the collision with the surrounding vehicle 500 in the center line (A), the left line (C), the right line (B), the left boundary line (E), the right boundary line (D), and the left lane (G) and the right lane (F) that are adjacent lanes, the host vehicle 100 may remain in waiting in the center line (A). Afterward, when the possibility of the collision with the surrounding vehicle 500 disappears, the host vehicle 100 may drive while following the center line (A) at the preset constant speed V0.

The route following device 137 may output a control signal to a driving control device (not illustrated) such that the host vehicle 100 may drive on a driving route selected through the host vehicle route determination device 135.

The driving control device may control the host vehicle 100 to drive along a selected driving route by operating a power generating device, a power transmission device, a driving device, a steering device, a braking device, a suspension device, a transmission device, and the like.

The storage 151 may store road information, map information, route creation programs, collision calculation programs, speed profile generation programs, and the like for autonomous driving of the host vehicle 100.

The output device 153 may be composed of a sound device, a display device, or the like, and may map the generated avoidance route and the selected avoidance route onto map data in connection with a navigation device (not shown) and may display the map data on a screen.

As described above, according to an autonomous driving system and method for preventing the collision with a cut-in vehicle, it is possible to allow an autonomous driving vehicle to perform avoidance driving to avoid a collision with a vehicle cutting in to the front during driving; it is possible to allow the autonomous driving vehicle to follow the center of the lane, to plan avoidance driving by generating a plurality of candidate avoidance routes for avoiding the collision with the cut-in vehicle cutting in to the front during driving, to apply the speed profile of the autonomous driving vehicle on the candidate avoidance routes, and to adjust the speed of the autonomous driving vehicle depending on a cut-in scenario, thereby avoiding the collision with the cut-in vehicle.

In the meantime, according to an embodiment of the present disclosure, the autonomous driving system and method for preventing the collision with a cut-in vehicle according to steps S101 to S119 may be programmed and stored in a computer-readable medium.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but provided only for the illustrative purpose. The scope of protection of the present disclosure should be construed by the attached claims, and all equivalents thereof should be construed as being included within the scope of the present disclosure.

The present technology may cause an autonomous driving vehicle to perform avoidance driving to avoid a collision with a vehicle cutting in to the front during driving; the present technology may allow the autonomous driving vehicle to follow the center of the lane, may plan avoidance driving by generating a plurality of candidate avoidance routes for avoiding the collision with the cut-in vehicle cutting in to the front during driving, may apply the speed profile of the autonomous driving vehicle on the candidate avoidance routes, and may adjust the speed of the autonomous driving vehicle depending on a cut-in scenario, thereby avoiding the collision with the cut-in vehicle.

Besides, a variety of effects directly or indirectly understood through the specification may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An autonomous driving system for preventing a collision with a cut-in vehicle, the system comprising:
    a counterpart vehicle detector configured to detect driving information of a surrounding vehicle to deliver the driving information of the surrounding vehicle to a vehicle controller;
    a host vehicle detector configured to detect driving information of a host vehicle to deliver the driving information of the host vehicle to the vehicle controller; and
    the vehicle controller configured to:
        generate a plurality of avoidance routes for avoiding a collision with the surrounding vehicle entering a front of the host vehicle;
        designate a reach location according to a speed at a specific interval on the avoidance routes; and
        select an avoidance route for avoiding the collision among the plurality of avoidance routes, and then control a speed of the host vehicle to reach the reach location for avoiding the collision with the surrounding vehicle on the selected avoidance route, when there is a possibility of a collision between the surrounding vehicle and the host vehicle,
    wherein the reach location includes:
        a constant speed location reached when the host vehicle drives at a constant speed;
        an acceleration location reached when the host vehicle drives by accelerating by a specific range from the constant speed; and
        a deceleration location reached when the host vehicle drives by decelerating by the specific range from the constant speed.

2. The system of claim 1, wherein the avoidance route includes:
    a lane;
    a left lane located on a left side of the lane; and
    a right lane located on a right side of the lane.

3. The system of claim 1, wherein the avoidance route includes:
    a center line that is a lane center of a lane;
    a left boundary line of the lane;
    a right boundary line of the lane;
    a left line between the center line and the left boundary line; and
    a right line between the center line and the right boundary line.

4. The system of claim 1, wherein the vehicle controller controls the host vehicle to maintain driving at the constant speed, when there is no possibility of the collision with the surrounding vehicle while the host vehicle is driving on a lane at the constant speed;
    controls the host vehicle to drive by accelerating to a speed for reaching the acceleration location such that the host vehicle avoids the collision with the surrounding vehicle, when the collision with the surrounding vehicle is expected while the host vehicle is driving in the lane at the constant speed, and an expected collision area is located behind the constant speed location on the selected avoidance route; and
    controls the host vehicle to drive by decelerating to a speed for reaching the deceleration location, to avoid the collision between the surrounding vehicle and the host vehicle when the collision with the surrounding vehicle is expected while the host vehicle is driving on the lane at the constant speed, and when an expected collision area is formed ahead of the constant speed location on the selected avoidance route.

5. The system of claim 4, wherein the vehicle controller controls the host vehicle to drive by returning to the constant speed when the host vehicle avoids the collision with the surrounding vehicle by decreasing to a speed of the deceleration location on the lane or by increasing to a speed of the acceleration location on the lane.

6. The system of claim 4, wherein the vehicle controller controls the host vehicle to drive at the constant speed by moving to an adjacent avoidance route, controls the host vehicle to drive by decelerating to a speed of the deceleration location on the adjacent avoidance route, or controls the host vehicle to drive by accelerating to a speed of the acceleration location on the adjacent avoidance route, when the host vehicle does not avoid the collision with the surrounding vehicle on the lane.

7. The system of claim 6, wherein the vehicle controller controls the host vehicle to drive at the constant speed by returning to the lane,
    when the host vehicle avoids the collision with the surrounding vehicle by driving at the constant speed while the host vehicle moves to the adjacent avoidance route, by driving while the host vehicle decelerates to the speed of the deceleration location on the adjacent avoidance route, or by driving while the host vehicle accelerates to the speed of the acceleration location on the adjacent avoidance route.

8. The system of claim 6, wherein the vehicle controller controls the host vehicle to stop on the lane after deceleration, when the possibility of the collision between the surrounding vehicle and the host vehicle is present on all the generated avoidance routes.

9. An autonomous driving method for preventing a collision with a cut-in vehicle, the method comprising:
    generating a plurality of avoidance routes for avoiding a collision with an surrounding vehicle entering a front of a host vehicle;
    designating a reach location according to a speed at a specific interval on the avoidance routes; and
    selecting an avoidance route for avoiding the collision among the plurality of avoidance routes, and then controlling a speed of the host vehicle to reach the reach location for avoiding the collision with the surrounding vehicle on the selected avoidance route, when there is a possibility of a collision between the surrounding vehicle and the host vehicle,
    wherein the designating of the reach location includes:
        designating the reach location including:

a constant speed location reached when the host vehicle drives at a constant speed;

an acceleration location reached when the host vehicle drives by accelerating by a specific range from the constant speed; and a deceleration location reached when the host vehicle drives by decelerating by the specific range from the constant speed.

10. The method of claim 9, wherein the generating of the plurality of avoidance routes includes:

generating the avoidance route including:

a lane;

a left lane located on a left side of the lane; and a right lane located on a right side of the lane.

11. The method of claim 9, wherein the generating of the plurality of avoidance routes includes:

generating the avoidance route including:

a center line that is a lane center of a lane;

a left boundary line of the lane;

a right boundary line of the lane;

a left line between the center line and the left boundary line; and a right line between the center line and the right boundary line.

12. The method of claim 9, wherein the selecting of the avoidance route includes:

controlling the host vehicle to maintain driving at the constant speed, when there is no possibility of the collision with the surrounding vehicle while the host vehicle is driving on a lane at the constant speed;

controlling the host vehicle to drive by accelerating to a speed for reaching the acceleration location such that the host vehicle avoids the collision with the surrounding vehicle, when the collision with the surrounding vehicle is expected while the host vehicle is driving in the lane at the constant speed, and an expected collision area is located behind the constant speed location on the selected avoidance route; and controlling the host vehicle to drive by decelerating to a speed for reaching the deceleration location, to avoid the collision between the surrounding vehicle and the host vehicle when the collision with the surrounding vehicle is expected while the host vehicle is driving on the lane at the constant speed, and when an expected collision area is formed ahead of the constant speed location on the selected avoidance route.

13. The method of claim 12, wherein the selecting of the avoidance route includes:

controlling the host vehicle to maintain driving by returning to the constant speed when the host vehicle avoids the collision with the surrounding vehicle by decreasing to a speed of the deceleration location on the lane or by increasing to a speed of the acceleration location on the lane.

14. The method of claim 12, wherein the selecting of the avoidance route includes:

controlling the host vehicle to maintain driving at the constant speed by moving to an adjacent avoidance route, controlling the host vehicle to drive by decelerating to a speed of the deceleration location on the adjacent avoidance route, or controlling the host vehicle to drive by accelerating to a speed of the acceleration location on the adjacent avoidance route, when the host vehicle does not avoid the collision with the surrounding vehicle on the lane.

15. The method of claim 14, wherein the selecting of the avoidance route includes:

controlling the host vehicle to maintain driving at the constant speed by returning to the lane, when the host vehicle avoids the collision with the surrounding vehicle by driving at the constant speed while the host vehicle moves to the adjacent avoidance route, by driving while the host vehicle decelerates to the speed of the deceleration location on the adjacent avoidance route, or by driving while the host vehicle accelerates to the speed of the acceleration location on the adjacent avoidance route.

16. The method of claim 14, wherein the selecting of the avoidance route includes:

controlling the host vehicle to stop on the lane after deceleration, when the possibility of the collision between the surrounding vehicle and the host vehicle is present on all the generated avoidance routes.

* * * * *